Figure 1:
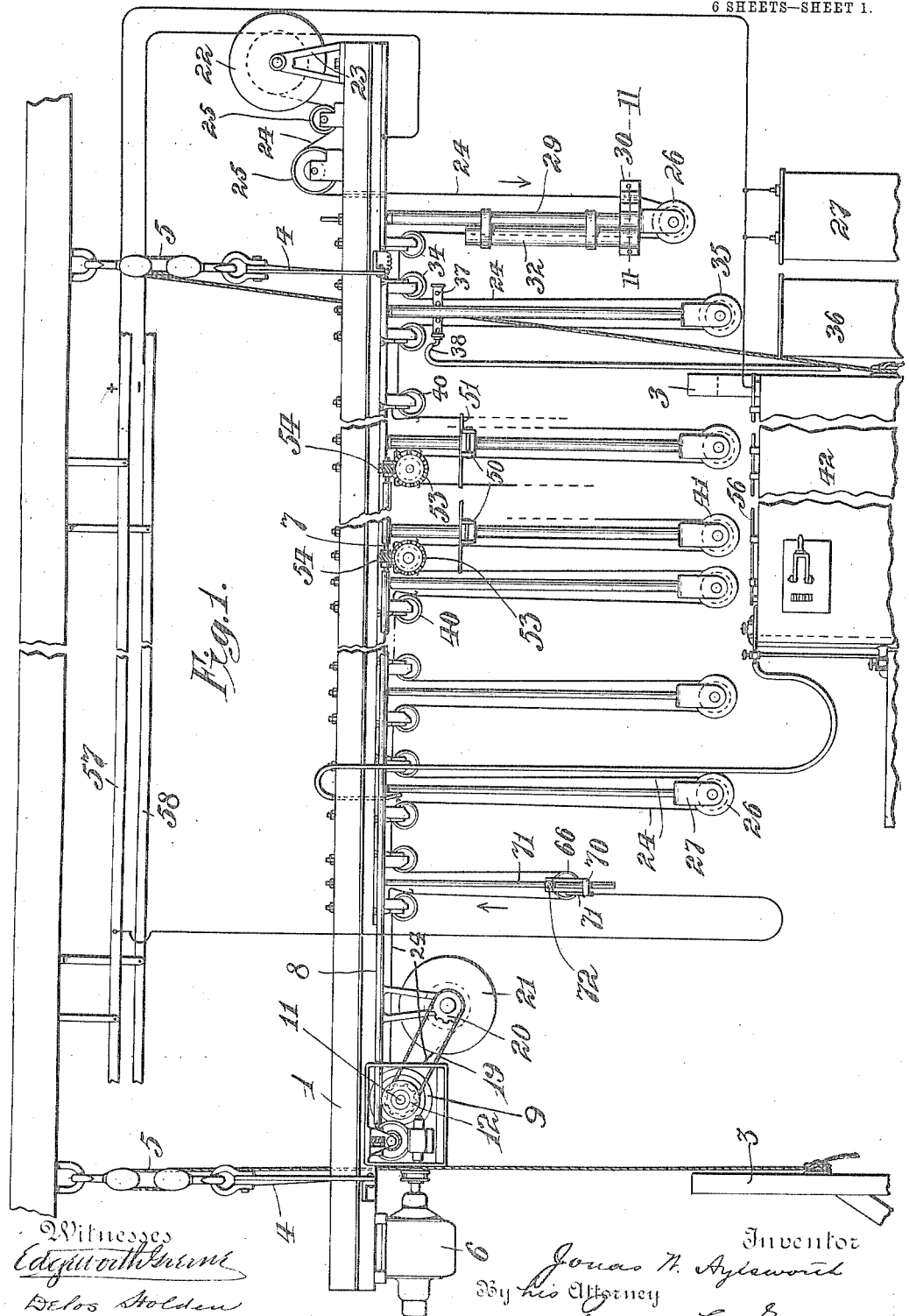

No. 817,152. PATENTED APR. 10, 1906.
J. W. AYLSWORTH.
APPARATUS FOR NICKEL PLATING.
APPLICATION FILED SEPT. 17, 1904.

6 SHEETS—SHEET 1.

Witnesses
Edgeworth Greene
Delos Holden

Inventor
Jonas W. Aylsworth
By his Attorney
Frank L. Dyer

No. 817,152. PATENTED APR. 10, 1906.
J. W. AYLSWORTH.
APPARATUS FOR NICKEL PLATING.
APPLICATION FILED SEPT. 17, 1904.

6 SHEETS—SHEET 3.

Witnesses
Edgeworth Greene
Delos Holden

Inventor
Jonas W. Aylsworth
By his Attorney
Frank L. Dyer

No. 817,152. PATENTED APR. 10, 1906.
J. W. AYLSWORTH.
APPARATUS FOR NICKEL PLATING.
APPLICATION FILED SEPT. 17, 1904.
6 SHEETS—SHEET 4.
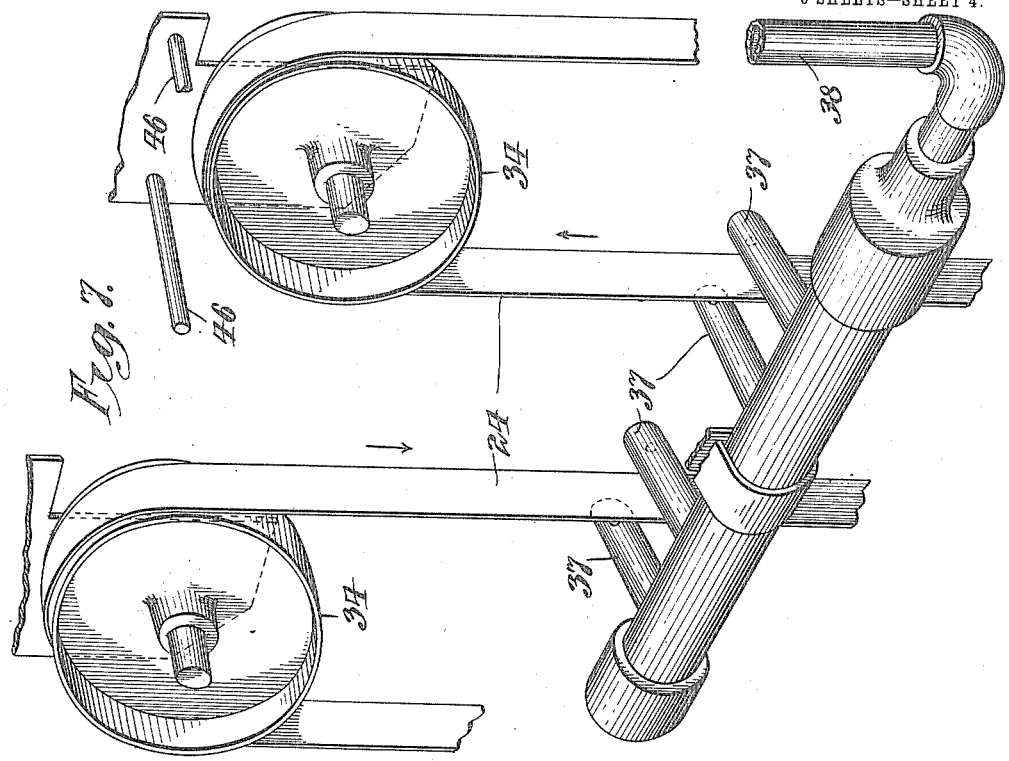
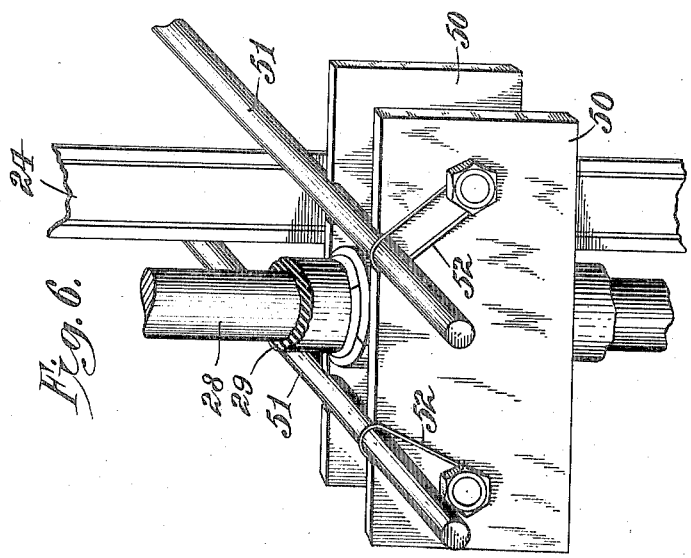
Witnesses
Edgworth Greene
Delos Holden
Inventor
Jonas W. Aylsworth
By his Attorney
Frank L. Dyer No. 817,152. PATENTED APR. 10, 1906.
J. W. AYLSWORTH.
APPARATUS FOR NICKEL PLATING.
APPLICATION FILED SEPT. 17, 1904.

6 SHEETS—SHEET 5.

Witnesses
Edgworth Greene
Delos Holden

Inventor
Jonas W. Aylsworth
By his Attorney
Frank L. Dyer

No. 817,152. PATENTED APR. 10, 1906.
J. W. AYLSWORTH.
APPARATUS FOR NICKEL PLATING.
APPLICATION FILED SEPT. 17, 1904.

6 SHEETS—SHEET 6.

Witnesses
Inventor

UNITED STATES PATENT OFFICE.

JONAS W. AYLSWORTH, OF EAST ORANGE, NEW JERSEY, ASSIGNOR TO EDISON STORAGE BATTERY COMPANY, OF WEST ORANGE, NEW JERSEY, A CORPORATION OF NEW JERSEY.

APPARATUS FOR NICKEL-PLATING.

No. 817,152.     Specification of Letters Patent.     Patented April 10, 1906.

Application filed September 17, 1904. Serial No. 224,822.

*To all whom it may concern:*

Be it known that I, JONAS W. AYLSWORTH, a citizen of the United States, residing at East Orange, county of Essex, State of New Jersey, have invented a certain new and useful Apparatus for Nickel-Plating, of which the following is a specification.

My invention relates to various new and useful improvements in continuous apparatus for nickel-plating of the general type described in Letters Patent No. 781,867, granted to me on February 7, 1905, in which a continuous strip or a connected series of separate articles is passed continuously through the plating-bath. The improved apparatus has been specifically designed for and has been commercially used in connection with the nickel-plating of long perforated strips of thin sheet iron or steel, which are subsequently cut up into blanks and formed into pocket-sections for use in the makeup of the improved Edison storage battery; but the applicability of the invention for use in connection with the plating of other articles or a connected series of separate articles will be apparent to those skilled in the art. In my said application I describe as a part of the process used the passage of the strip through a chamber in which it is surrounded by hydrogen gas and is heated by the current or otherwise to a welding temperature, so as to cause the nickel film to be welded in place to remove any condition of tension therein. I find in practice that this operation is not necessary as a part of the plating process and that superior results can be secured by placing a large number of the reels carrying the nickel-plated strips thereon in a muffle wherein they are heated to a welding temperature in the presence of hydrogen gas, since in this way the operation can be very economically performed.

The objects of my invention are to provide a simple, compact, and convenient apparatus in which an effective nickel-plating process can be carried out with the concomitant operations of pickling, washing, and drying and wherein the strip can be readily removed from the several tanks or receptacles for inspection or readjustment.

In order that the invention may be better understood, attention is directed to the accompanying drawings, forming a part of this specification, and in which—

Figure 2:
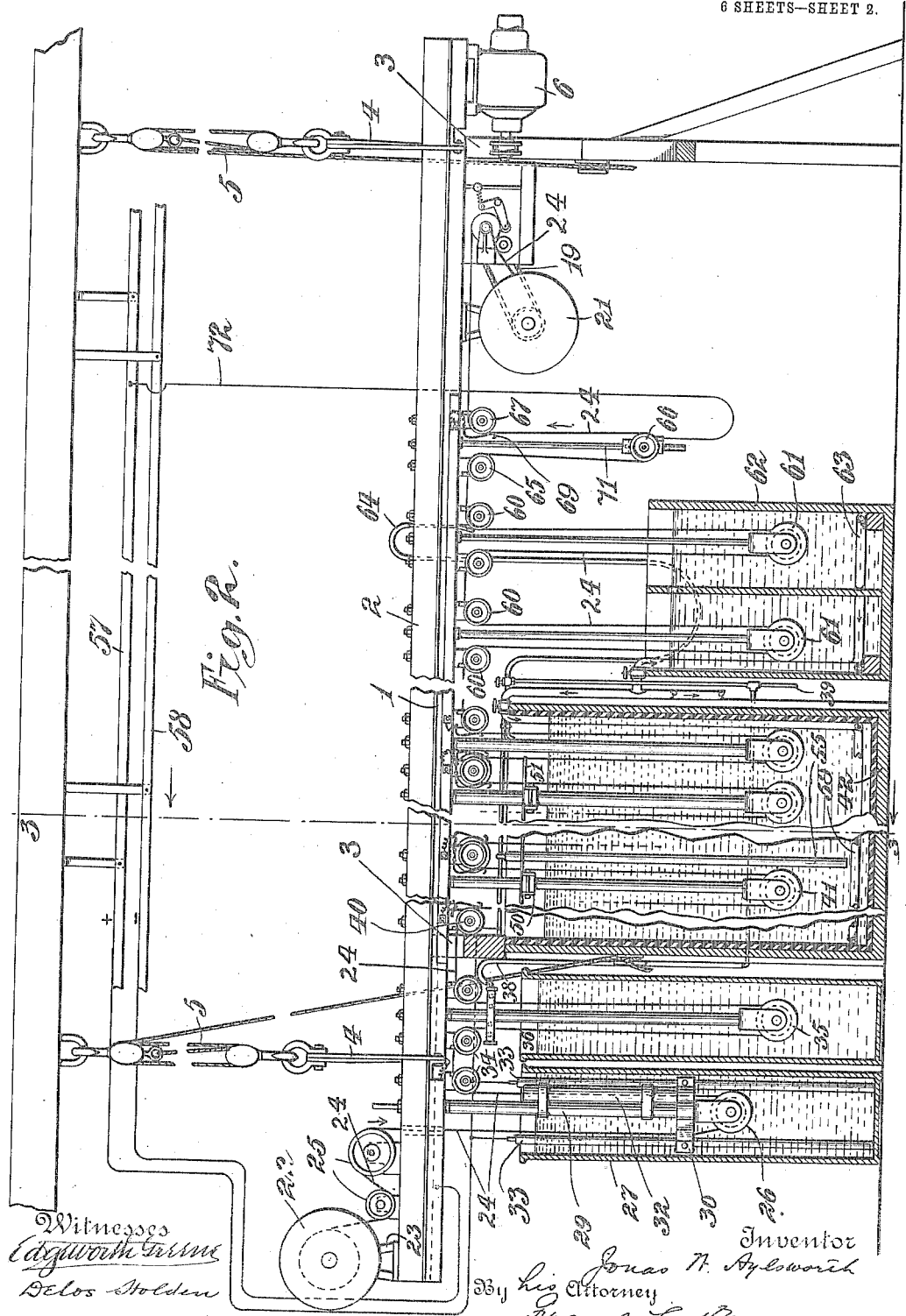
Figures 3, 4, 5:
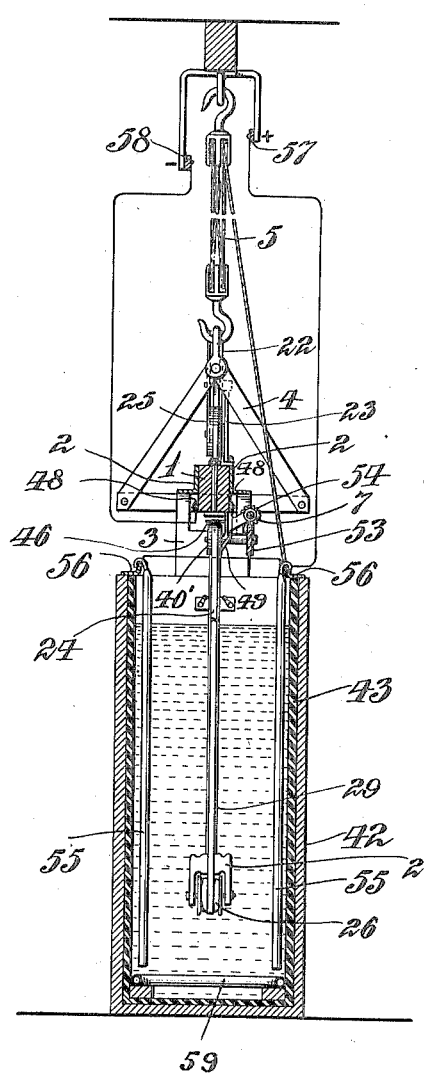
Figure 8:
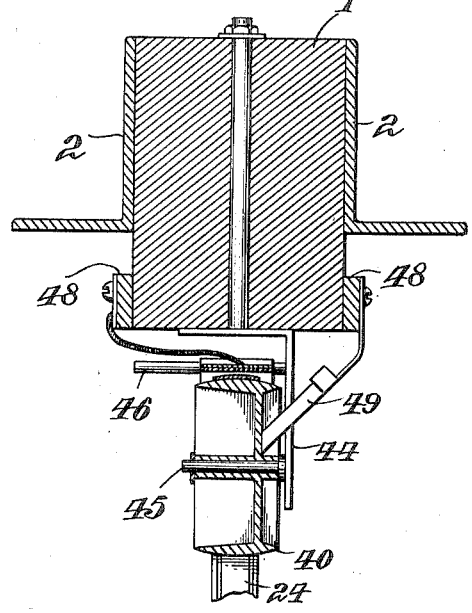
Figure 9:
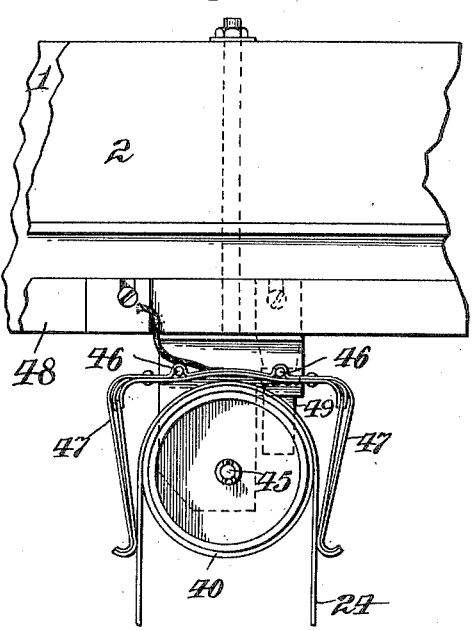
Figure 10:
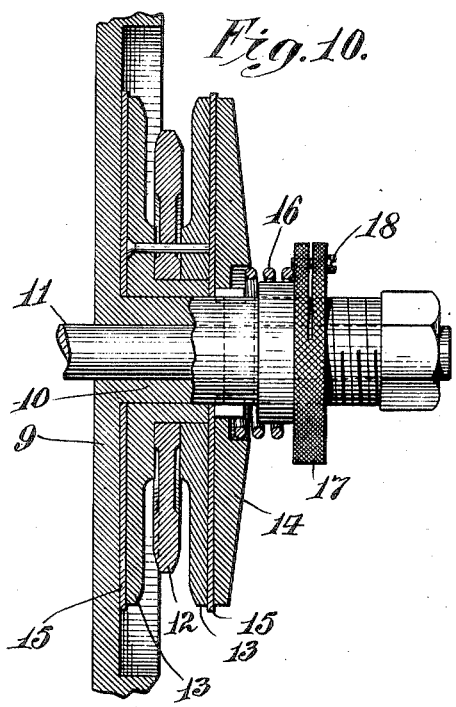
Figure 11:
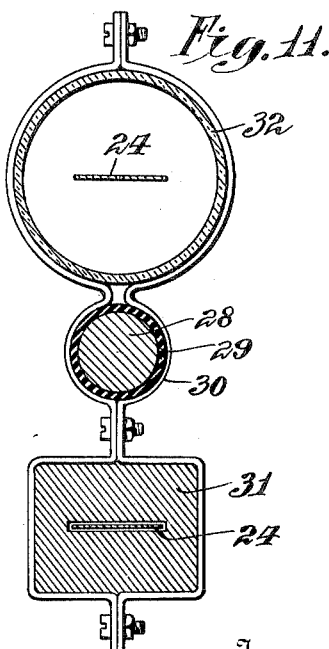
Figure 12:
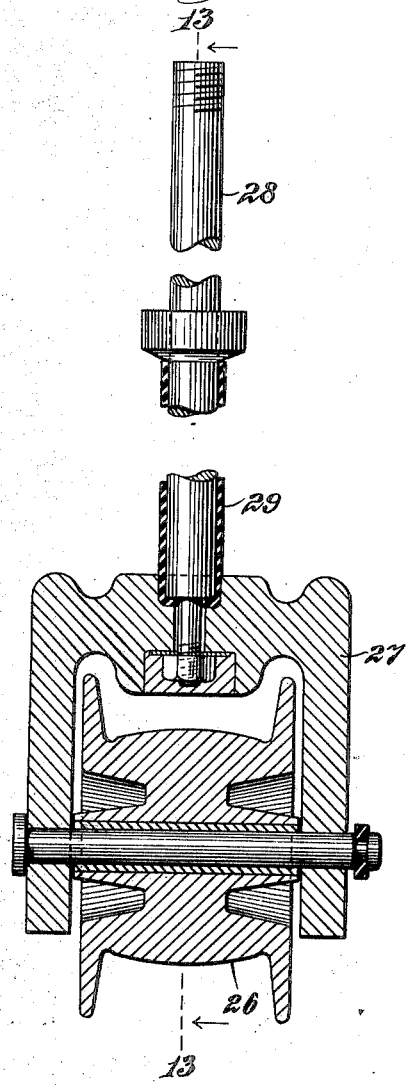
Figure 13:
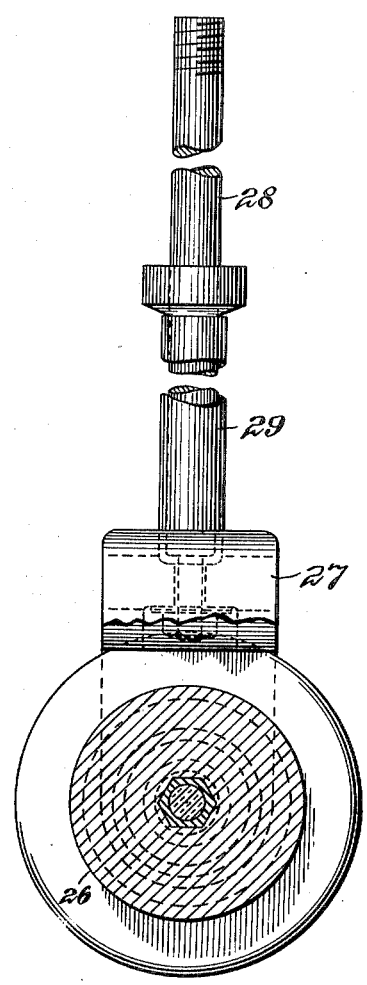

Figure 1 is a side elevation of the apparatus, partly broken away, the sustaining-beam being in its raised position; Fig. 2, a longitudinal sectional view of the same with the sustaining-beam in its lowered position; Fig. 3, a cross-sectional view on the line 3 3 of Fig. 2; Fig. 4, a detail of the adjustable pulley over which the strip passes in the drying device; Fig. 5, a detail sectional view illustrating the supporting of the sustaining-beam; Fig. 6, a detail perspective view illustrating the manner of guiding the strip in the plating-bath; Fig. 7, a detail perspective view showing the spraying of the strip in connection with the preliminary washing operation; Fig. 8, a detail sectional view showing the manner of mounting the pulleys on the sustaining-beam; Fig. 9, a detail elevation of the same parts; Fig. 10, a detail sectional view illustrating the frictional driving mechanism of the take-up wheel; Fig. 11, a section on line 11 11 of Fig. 1; Fig. 12, a longitudinal sectional view through one of the supporting-pulleys for the strip, and Fig. 13 a sectional view on the line 13 13 of Fig. 12.

In all of the above views corresponding parts are represented by the same numerals of reference.

The sustaining-beam 1 is of wood, rectangular in cross-section, and is strengthened and braced by angle-irons 2, bolted to the side faces thereof, as shown. (See Figs. 5 and 8.) When the sustaining-beam is in its lowered position, the horizontal flanges thereof rest upon two or more supports 3. Connected to the sustaining-beam 1 are two hangers 4 4, each of which is engaged by a block and tackle 5, by which the sustaining-beam may be elevated to the position shown in Fig. 1. Mounted on the under side of the sustaining-beam is an electric motor 6, which through suitable gearing drives the shaft 7, mounted in a tubular bearing-sleeve 8 at the side of the beam 1. The said motor also drives a disk 9, (see Fig. 10,) having a boss 10 and mounted on a shaft 11. Carried on the boss 10 is a friction-gear composed of a sprocket-wheel 12, provided with disks 13 13 rigidly secured thereto. Keyed to the boss 10, but movable longitudinally thereon, is a disk 14, and located between the disk 14 and one of the disks 13 and between the other disk 13 and the disk 9 are leather washers 15. The parts are held longitudinally together by a spring 16 on the boss 10, adjustable by a nut 17. This nut is split and the parts are adapted to be clamped together by a screw 18 for locking the nut rigidly in position for adjustment. Obviously by means of the construction described the sprocket-wheel 12 will be rotated frictionally, but will be free to slip if the strip meets with any abnormal obstruction. A chain 19 engages the sprocket-wheel 12 and drives a sprocket-wheel 20 on the take-up reel 21. The let-off reel 22 is removably carried in brackets 23 at the top of the sustaining-beam at the other end thereof. From the let-off reel 22 the strip 24 passes over tension-rollers 25 and thence over a roller 26 in the pickling-tank 27. The roller 26 (see Figs. 11, 12, and 13) is mounted in the bracket 27, secured to the lower end of a rod 28, carried by the beam 1 and protected by a rubber sleeve 29. Secured over the sleeve 29 is a clamp 30, which at one end carries an insulating guide-block 31, through which the strip passes, and at the other end a glass tube 32, forming an occluding chamber and reaching above the level of the solution in the pickling-tank, as shown in Fig. 2, so that the strip in leaving the pickling solution will not be contaminated with grease or other matter floating thereon. In the pickling-chamber are one or more anodes 33, made of pure carbon or graphite. From the pickling-tank the strip passes over idlers 34, carried by the sustaining-beam 1, and thence down and around a pulley 35 in a wash-tank 36. The pulley 35 is constructed and supported like pulley 26. The strip 24 in passing into and out of the wash-tank 36 extends between the two pairs of nozzles 37 37, (see Fig. 7,) supplied with water from a pipe 38, leading from a main 39. (See Fig. 2.) The surplus water from the spray-nozzles 37 is carried off from the wash-tank 36 through any suitable overflow. From the wash-tank 36 the strip passes successively over idlers 40 and pulleys 41, the latter being of the same construction as the pulleys 35 and 26, respectively, and being located in the plating-tank 42, in which the plating operation takes place. This tank is of any suitable construction and is preferably lined with a layer of rubber 43. The special construction of the pulleys 40 is shown in Figs. 8 and 9. Secured to the under side of the sustaining-beam 1 are brackets 44, carrying pins 45, on which the idlers 40 are mounted. These brackets are also provided with pins 46, on which are carried the spring-brushes 47, making contact with the strip 24. At the sides of the beam 1 are conducting-bars 48, with which electrical connection is made, as shown, to the brushes 47 and through the brushes 47 to the idlers 40.

In order to properly guide the strip 24 in its position over the idlers 40 and pulleys 41 in the plating-tank 42, I bolt a pair of blocks 50 to the hangers of two of the pulleys (see Fig. 6) and support upon such blocks a pair of glass rods 51, held in place by wire clips 52 and between which the strip travels. Preferably in place of two or more of the idlers 40 are provided drive-pulleys 40' with skew-gears 53, (see Figs. 1 and 3,) which engage skew-gears 54 on the shaft 7 in order that the strip may be driven at one or more points intermediate of its length and may therefore be subjected to less strain than if driven entirely by the take-up reel 21, as will be obvious. Carried within the plating-tank 42 are anodes 55, of nickel or other metal to be plated on the strip or series of articles. These anodes are hung over conductors 56 at the top of the plating-tank, (see Fig. 3,) with which connection is made, as shown, with an overhead conductor 57, leading to the source of supply. The other conductor 58 connects with the conducting-strips 48, before referred to, which are in turn electrically connected with the strip through the idlers 40 and brushes 47, as before described.

The best results in practice are secured in nickel-plating when the solution in the plating-tank 42 is maintained in a heated condition, and for this purpose a steam-coil 59 is located within the plating-tank, supplied from any suitable source and having the proper controlling-valves by which the steam may be regulated. From the plating-tank the strip passes over idlers 60 and around pulleys 61 in a hot-water tank 62 and in which a final washing takes place, the water in said tank being maintained in a heated condition by a steam-coil 63, as shown. A spray of water 64 is also thrown on the strip after leaving the hot-water tank to insure the complete cleansing of the strip, the water from this spray falling into the hot-water tank to constantly replenish the same, any surplus passing off as vapor or through a proper overflow-outlet. Preferably the hot-water tank 62 is divided into two sections by a vertical partition, as shown, over which the water flows from the right-hand compartment to the left-hand compartment, from which leads the overflow-outlet. Obviously the water in the former will be relatively clean and is being constantly replenished from the spray 64. In this way the strip will receive a final washing in comparatively clean water before reaching the drying operation. From the hot-water tank the strip passes over an idler 65, thence around an adjustable pulley 66 in the drying apparatus, and over an idler 67, from which it leads to the take-up reel, as shown. The drying of the strip is effected preferably electrically by passing the current through the same, so that the resistance of the strip will generate sufficient heat for the purpose. To this end the idler 67 is of the same construction as the idlers 40, being electrically connected with one of the conductors 48 and a brush 69, also connected to one of said conductors, bearing on the strip adjacent to said idler. The pulley 66 (see Fig. 4) is carried in a frame 70, adjustable longitudinally on a hanger 71 and operated by a handle 72, which may be turned to lock the frame 70 in any position of adjustment on the hanger. The frame 70 carries a brush 71', which is connected by a conductor 73 with the positive conducting-bar 57, as shown, whereby the strip 24 will be connected directly across the line and a current of any desired capacity for the purpose may be caused to flow through the same. Obviously by regulating the position of the frame 70 on the hanger 71 the length of the section of the strip through which the current passes may be adjusted and the resistance of the circuit thereby controlled to obtain any desired heating effect for thoroughly drying the strip prior to its accumulation on the take-up reel.

In the pickling or cleaning tank an alkaline solution is used, such as a ten-per-cent. solution of cyanid of potassium, and since the anodes employed are of pure carbon nothing in this tank can be plated out of the solution upon the strip. Consequently the only effect of the action of the current in the cleaning-tank is to cause the generation of large quantities of hydrogen gas upon the strip, which gas in being violently detached from the strip results in a very perfect cleaning operation, as described in application of Thomas A. Edison, filed June 29, 1904, Serial No. 214,652. I therefore make no claim to the specific pickling or cleaning process *per se*, but only when used in connection with the rest of the apparatus.

The operation of my improved apparatus will be readily understood in connection with the foregoing description. In the cleaning-tank 27 the strip will be cleaned of all foreign matter, including grease, oily films, and dirt, adhering to the same, and the strip will leave the solution therein through the occluding chamber or tubing 32, so as not to be contaminated by any foreign matter floating on the surface. In the cold-water tank 36 the strip will be immersed in cold water and washed and also by the spray-nozzles 37, which maintain a considerable supply of clean water to the tank 36. In the plating-tank 42 the plating operation will be performed in the usual way as I describe in my said application above referred to. After the plating operation has been effected the strip enters the hot-water tank and is then washed with hot water. From this tank the strip then encounters the spray 64, by which it is completely cleansed. Finally, the strip will be subjected to the effect of the current in the drying device and by which all traces of moisture will be removed therefrom. After the strip has been accumulated on the take-up reel one or more of such reels with the plated strips thereon are placed in a retort and subjected to the effect of heat in the presence of hydrogen gas or other non-oxidizable atmosphere, whereby the nickel film will be welded to the strip and any condition of tension therein will be eliminated, as described in Patent to Thomas A. Edison, No. 734,522, of July 28, 1903.

Having now described my invention, what I claim as new therein, and desire to secure by Letters Patent, is as follows:

1. In an apparatus for the plating of a continuous strip, the combination of a support, means for sustaining and moving a continuous strip relatively to the support, a cleaning-tank in which the strip may be normally submerged, means for raising and lowering the support, and an occluding chamber carried by the support and normally partially submerged in the solution, substantially as set forth.

2. In an apparatus for the plating of a continuous strip, the combination of a supporting-beam, means for raising and lowering said beam, a motor, a take-up reel operated by said motor, supporting-pulleys carried by the beam and over which runs the strip to be plated and connections between said motor and one of said pulleys, substantially as set forth.

3. In an apparatus for the plating of a continuous strip, the combination of a support, means for sustaining and moving the strip to be plated with respect to the support, a plating-bath in which the strip may be submerged and through which it may pass, means for applying current to a section of the strip after leaving the plating-bath, whereby said section will be heated for the purpose of drying the same, and means for regulating the length of the heated section, substantially as set forth.

4. In apparatus for continuously drying a long moving strip of metal, the combination of two rollers over which the strip is adapted to pass, means for moving the strip with respect to said rollers, means for applying current to said rollers to include the section of the strip between them in the circuit and means for adjusting the rollers with respect to each other to regulate the length of the heated section, substantially as set forth.

5. In an apparatus for the plating of a continuous strip, the combination of a plating-bath, a series of hangers immersed therein and over which the strip to be plated is adapted to pass and guide-bars carried by said hangers for guiding the strip, substantially as set forth.

6. In an apparatus for the plating of a continuous strip, a support, a bracket carried by the support, an idler mounted on said bracket and over which the strip to be plated is adapted to pass and removable contact-brushes carried by the support and adapted to make contact with the strip on each side of the idler, substantially as set forth.

7. In an apparatus for the plating of a continuous strip, the combination of a sustaining-beam, a plating-bath, means for supporting the strip to be plated with respect to the beam, a take-up reel to which the strip may be applied, a motor, and frictional connections between the motor and said take-up reel, substantially as set forth.

8. In an apparatus for the plating of a continuous strip, the combination of a sustaining-beam, a plating-bath, means for supporting the strip to be plated with respect to the beam, a take-up reel to which the strip may be applied, a motor, and adjustable frictional connections between the motor and said take-up reel, substantially as set forth.

9. In an apparatus for the plating of a continuous strip, the combination of a plating-bath, a series of hangers immersed therein and over which the strip to be plated is adapted to pass, and guide-bars of insulating material carried by said hangers for guiding the strip, substantially as set forth.

10. In an apparatus for the plating of a continuous strip, the combination of a tank containing a plating-bath, a support carrying upper and lower sets of rollers and adapted to receive a strip extending alternately around the rollers of each set, means adapted to progressively move such a strip through the bath, and means for raising and lowering said support, substantially as set forth.

11. In an apparatus for the plating of a continuous strip, the combination of a tank containing a plating-bath, a support carrying upper and lower sets of rollers and adapted to receive a strip extending alternately around the rollers of each set, means carried by said support adapted to progressively move such a strip through the bath and means for raising and lowering said support, substantially as set forth.

12. In an apparatus for the plating of a continuous strip, the combination of a tank containing a plating-bath, a support carrying upper and lower sets of rollers and adapted to receive a strip extending alternately around the rollers of each set, a take-up reel on said support, means for driving said reel, and means for raising and lowering said support, substantially as set forth.

13. In an apparatus for the plating of a continuous strip, the combination of a tank containing a plating-bath, a support carrying upper and lower sets of rollers and adapted to receive a strip extending alternately around the rollers of each set, a take-up reel and driving-motor mounted on said support and means for raising and lowering said support, substantially as set forth.

14. In an apparatus for the plating of a continuous strip, the combination of a tank containing the plating-bath, a support carrying upper and lower sets of rollers and adapted to receive a strip extending alternately around the rollers of each set, means for driving one or more rollers of the upper set and means for raising and lowering said support, substantially as set forth.

15. In an apparatus for the plating of a continuous strip, the combination of a tank containing a plating-bath, a support carrying upper and lower sets of rollers and adapted to receive a strip extending alternately around the rollers of each set, a driving-motor mounted on said support, driving connections for one or more of the rollers of the upper set and means for raising and lowering said support, substantially as set forth.

This specification signed and witnessed this 2d day of September, 1904.

JONAS W. AYLSWORTH.

Witnesses:
 DELOS HOLDEN,
 HARRY G. WALTERS.